United States Patent [19]
Ohara et al.

[11] Patent Number: 5,993,988
[45] Date of Patent: Nov. 30, 1999

[54] COMPOSITE CERAMIC POWDER, METHOD FOR MANUFACTURING THE POWDER, ELECTRODE FOR SOLID ELECTROLYTIC FUEL CELL, AND METHOD FOR MANUFACTURING THE ELECTRODE

[75] Inventors: Satoshi Ohara; Takehisa Fukui, both of Nagoya; Kaseki Kodera, Akashi, all of Japan

[73] Assignee: Japan Fine Ceramics Center, Aichi-ken, Japan

[21] Appl. No.: 08/973,870

[22] PCT Filed: May 26, 1997

[86] PCT No.: PCT/JP97/01764

§ 371 Date: Jan. 7, 1998

§ 102(e) Date: Jan. 7, 1998

[87] PCT Pub. No.: WO97/45885

PCT Pub. Date: Dec. 4, 1997

[30] Foreign Application Priority Data

May 24, 1996 [JP] Japan .................................. 8-153154

[51] Int. Cl.[6] .................................................. H01M 4/86
[52] U.S. Cl. .............................. 429/40; 429/45; 429/30; 419/1; 419/5; 419/6; 419/11; 419/19; 427/215; 427/216; 427/180; 427/199; 204/290 R; 204/291; 29/746

[58] Field of Search .................................. 419/1, 5, 6, 11, 419/19; 429/40, 45, 30; 427/215, 216, 180, 199; 29/746; 204/290 R, 291

[56] References Cited

U.S. PATENT DOCUMENTS

| | | | |
|---|---|---|---|
| 5,474,800 | 12/1995 | Matsuzaki | 427/115 |
| 5,749,938 | 5/1998 | Coombs | 427/216 |

FOREIGN PATENT DOCUMENTS

| | | |
|---|---|---|
| 07022032 | 1/1995 | Japan . |
| 08213028 | 8/1996 | Japan . |

*Primary Examiner*—Bruce F. Bell
*Attorney, Agent, or Firm*—Dennison, Meserole, Scheiner & Schultz

[57] ABSTRACT

An object of the present invention is to provide composite ceramic powder containing composite ceramic particulates as constituent particulates. Each of the composite ceramic particulates is constituted of a group of first particles and a group of second particles in which the first particles are localized around the second particles. A spray pyrolysis is used to localize the first particles around the second particles, thereby producing such composite ceramic particulates.

17 Claims, 5 Drawing Sheets

COMPOSITE CERAMIC POWDER, METHOD FOR MANUFACTURING THE POWDER, ELECTRODE FOR SOLID ELECTROLYTIC FUEL CELL, AND METHOD FOR MANUFACTURING THE ELECTRODE

TECHNICAL FIELD

The present invention relates to composite ceramic powder and a method of manufacturing the same, and electrodes of a solid oxide fuel cell (hereinafter referred to as "SOFC") and a method of manufacturing the same.

BACKGROUND ART

In general, composite ceramic powder containing two or more types of ceramic materials is constituted of secondary particles or composite particulates each of which is formed by agglomerating primary particles made of respective ceramic materials. A conventional method of manufacturing such composite ceramic powder includes the steps of providing two or more types of coarse powdered materials, pulverizing the coarse powdered materials by using a pulverizer to form fine powdered materials, mixing the produced fine powdered materials in a ball mill, calcining the mixture, and milling the calcined mixture to form composite ceramic particulates. Another conventional method of manufacturing such composite ceramic powder includes the steps of dissolving two or more types of powdered materials to form a solution of the materials, thermally decomposing by dropping the solution into a furnace, calcining the decomposed materials, and milling the calcined materials to form fine composite ceramic particulates. The latter method is known as a drip pyrolysis.

Some composite ceramic powder thus manufactured has been used as a material for forming electrodes of an SOFC.

In the composite ceramic powder thus manufactured, the composite ceramic particulates have irregular shapes. This is because they are produced by mechanically grinding mass products which are formed by agglomerating the primary particles made of respective materials. Thus, it is substantially impossible to obtain the composite ceramic particulates having spherical shapes. Moreover, the electrodes of the SOFC made of such composite ceramic powder do not exhibit acceptable electrical properties.

The present inventors have developed composite ceramic powder constituted of spherical composite particulates and a method of manufacturing the same. The developed technique is fully shown in Japanese Patent Application No. 6-82399 (Japanese Laid-Open Patent Publication No. 7-267613) previously filed.

As described therein, the composite ceramic particulates contained in the composite ceramic powder are solid spherical particulates each of which is produced by agglomerating the primary particles in a substantially uniform dispersion state. Further, the method of manufacturing the composite ceramic powder constituted of such spherical composite particulates includes the steps of atomizing a solution of two or more types of raw materials to form mist thereof, drying the mist at temperatures below the temperature at which the raw materials can be thermally decomposed, and then thermally decomposing the raw materials.

This technique may provide the composite ceramic powder containing the spherical composite particulates each of which is produced by agglomerating the primary particles in the substantially uniform dispersion state. The composite ceramic powder thus manufactured may exhibit increased electrical properties. Therefore, the composite ceramic powder is very suitable as the materials for forming the electrodes.

In the composite ceramic powder thus manufactured, the primary particles in each spherical composite particulate are substantially uniformly dispersed. In other words, each composite particulate has a uniform composite form. However, if each type of primary particles may exhibit inherent functions, it is not necessarily desirable that the composite particulate has such a uniform composite form.

It is desired to develop a new and superior composite form of the secondary particles or composite ceramic particulates in which the primary particles are preferably dispersed in a controlled dispersion state, thereby further increasing properties of composite ceramic powder constituted of such composite ceramic particulates and articles made of the composite ceramic powder and finding new uses of the composite ceramic powder.

Moreover, the electrodes of the SOFC formed of the conventional composite ceramic powder gradually deteriorates with time and results in inferior performance. Such deterioration of the electrodes is caused by undesirable aggregation of the conductive materials derived from some of the primary particles. In general, the electrodes of the SOFC must maintain their performance for a long period of time such that the SOFC can be continuously used over tens of thousands of hours.

To remove such a disadvantage, it is desired to change the composite form of the composite ceramic particulates of the composite ceramic powder for effectively preventing the undesirable aggregation of the primary particles, so that the electrodes made of the composite ceramic powder do not degrade for a long period of time.

DISCLOSURE OF THE INVENTION

An object of the present invention is to provide composite ceramic powder constituted of composite ceramic particulates each having a new composite form and a method of manufacturing the same. Moreover, another object of the present invention is to provide electrodes of an SOFC which may maintain electrical properties thereof and a method of manufacturing the same.

To achieve the objects described above, the present inventors provide the following inventions.

The present invention is directed to composite ceramic powder containing composite ceramic particulates as constituent particulates. Each of the composite ceramic particulates is constituted of a group of first particles and a group of second particles in which the first particles are localized around the second particles.

With this invention, each composite ceramic particulate of the composite ceramic powder has a novel composite form in which the first particles are localized around the second particles. This invention enables the first and second particles to be particles having different functions such that the composite ceramic powder and any ceramic products thereof may have new additional functions and improved conventional functions. The composite ceramic powder is suitable for forming the electrodes of the SOFC, specifically for forming a fuel electrode of the SOFC. The composite ceramic powder is also suitable for forming a sintered catalytic product. The electrodes formed by sintering such composite ceramic powder may stably exhibit desired electrical properties for a long period of time.

The present invention provides a method of manufacturing composite ceramic powder containing composite ceramic particulates, each of the composite ceramic particulates being constituted of a group of first particles and a group of second particles in which the first particles are localized around the second particles, which includes the steps of atomizing a raw material liquid containing raw materials of the first particles and raw materials of the second particles, thereby forming mist thereof, drying the mist at temperatures below the temperature at which each raw material can be thermally decomposed, and thermally decomposing the raw materials. In the step of drying the mist, the raw materials of the first particles are localized around the raw materials of the second particles.

This method may produce the composite ceramic powder containing the composite particulates in which the first particles are localized around the second particles. With this method, physical states of the raw materials in the atomized raw material liquid may be controlled in the step of drying the mist, thereby controlling the composite form of each composite particulate to be produced.

BEST MODE FOR CARRYING OUT THE INVENTION

Figure 1:
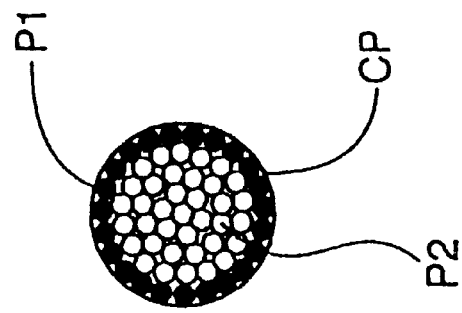
FIG. 1 is an explanatory view of a formation process of a composite ceramic particulate in a method of manufacturing composite ceramic powder according to the present invention.
Figure 1:
Figure 1:
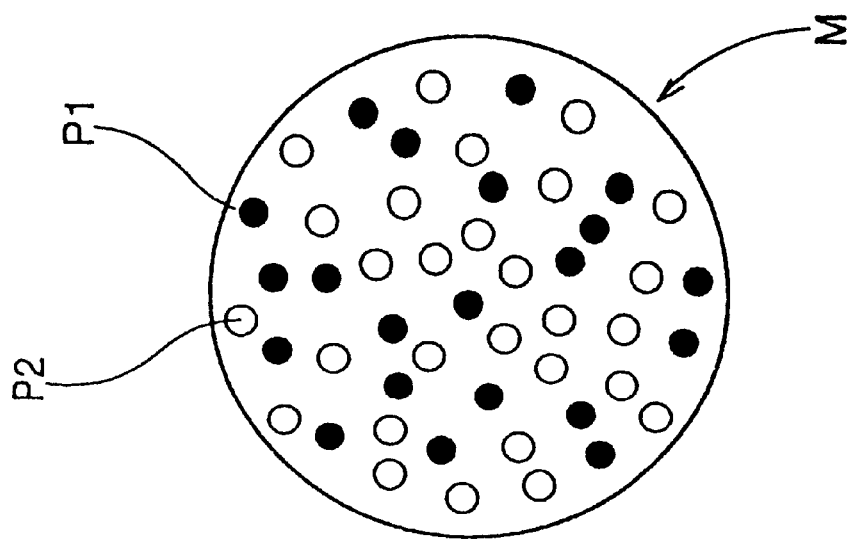

The present invention will be described below in detail.

Composite ceramic powder of the present invention includes composite ceramic particulates each of which is constituted of a group of first particles and a group of second particles. With regard to each composite ceramic particulate, the second particles are agglomerated in a core-like pattern, and the first particles are agglomerated in a shell-like pattern to entirely cover the surface of the agglomerated second particles. In other words, the first particles are localized around the agglomerated second particles and are not dispersed in the second particles. It is important to note, however, that the first particles may be agglomerated as another pattern. For example, they may be agglomerated as an incomplete shell-like pattern so as to partially cover the surface of the agglomerated second particles.

Each composite ceramic particulate may have various types of shapes. Each composite ceramic particulate may have an indeterminate shape, a spherical shape, a deformed spherical shape or other shapes. According to a method of manufacturing the composite ceramic powder of the present invention, each composite ceramic particulate as produced has a substantially spherical shape. As will be appreciated, the produced composite ceramic particulates may be ground to form indeterminate shape of composite ceramic particulates in each of which the first particles remain localized around the second particles.

In the present invention, it is preferable that each composite particulate has a spherical shape or a substantially spherical shape. If each composite particulate has such a shape, it may present a point-contact or uniform contact with the adjacent composite ceramic particulates. The composite ceramic powder constituted of such composite ceramic particulates may be sintered with a good sintering state, thereby forming a uniform sintering structure. Additionally, such composite ceramic powder may facilitate compacting or pressing and also permit close packing.

Each composite ceramic particulate may be of a solid type or a hollow type. However, the solid type one is preferable in respect to strength and electrical properties thereof. Moreover, each composite ceramic particulate may have wrinkling on the surface thereof.

The first particles may be particles made of a single type of material or a blend of particles made of two or more types of materials. Similarly, the second particles may be particles made of a single type of material or a blend of particles made of two or more types of materials.

In the present invention, it is preferable that the second particles are made of catalytic materials which may exhibit catalytic activity. On the other hand, it is preferable that the first particles are made of carrier materials which may act as a catalytic carrier.

The composite ceramic powder containing the composite ceramic particulates each of which is composed of the first and second particles made of such materials is suitable for forming a sintered catalytic product. In the sintered catalytic product produced by sintering such composite ceramic powder, agglomerated catalytic particles are surrounded by agglomerated carrier particles to form a dispersion structure in which the agglomerated catalytic particles are separately carried by the agglomerated carrier particles. Such a structure may prevent aggregation of the agglomerated catalytic particles. According to a carrying structure of the agglomerated catalytic particles, the agglomerated catalytic particles are prevented from mutually bonding when the sintered catalytic product is used at higher temperatures. This may prevent aggregation of the agglomerated catalytic particles which may be caused by the mutual bonding thereof. As a result, the agglomerated catalytic particles maintain specific active surface areas, thereby preventing reduction of the catalytic activity thereof.

In the composite ceramic powder suitable for forming the sintered catalytic product, the materials for the second particles may be one or more members selected from the group consisting of metals such as nickel, cobalt and iron; noble metals such as platinum, palladium and ruthenium; and oxides such as zinc oxide, tin oxide, copper oxide and lanthanum manganate. Further, the materials for the first particles may be one or more members selected from the group consisting of oxides such as aluminum oxide, silicon oxide, magnesium oxide and titanium oxide.

Moreover, in the present invention, it is preferable that the second particles are made of precursor materials of conductive materials for electrodes of an SOFC. On the other hand, it is preferable that the first particles are made of precursor materials of carrier materials each of which may act as a carrier for the conductive materials in the electrodes.

In the electrodes produced by sintering the composite ceramic powder containing the composite ceramic particulates each of which is composed of the first and second particles made of such precursor materials, agglomerated particles of the conductive materials or conductive particles are surrounded by the agglomerated particles of the carrier materials or carrier particles to form a dispersion structure in which the agglomerated conductive particles are separately carried by the carrier particles. Such a structure may prevent undesirable aggregation of the conductive particles. According to the structure of the electrodes of the SOFC, the conductive particles are prevented from aggregating with each other when the electrodes are used at higher temperatures. This may prevent the electrodes from deteriorating the electrical properties thereof. Consequently, such composite ceramic powder may provide the electrodes which may stably exhibit desired electrical properties for a long period of time.

In this specification, the conductive materials for the electrodes of the SOFC have conductive properties and catalytic properties. Additionally, the carrier materials for the electrodes of the SOFC have carrying properties for carrying the conductive materials and ionic conductive properties.

In the composite ceramic powder suitable for forming a fuel electrode of the SOFC, the materials for the second particles may be one or more members selected from the group consisting of oxides of nickel, solid solutions of oxides of nickel and oxides of magnesium, oxides of cobalt and ruthenium. Further, the materials for the first particles may be one or more members selected from the group consisting of stabilized zirconia (FSZ) represented by yttria stabilized zirconia (YSZ), partially stabilized zirconia (PSZ) and ceric oxide doped with rare-earth oxides. Preferably, the second particles and the first particles are made of NiO and YSZ, respectively.

In the composite ceramic powder suitable for forming an air electrode of the SOFC, the materials for the second particles may be one or more members selected from the group consisting of $(La,Sr)MnO_3$, $(La,Ca)MnO_3$, $(La,Sr)CoO_3$ and $(La,Ca)CoO_3$. Further, the materials for the first particles may be one or more members selected from the group consisting of stabilized zirconia, partially stabilized zirconia and ceric oxide doped with rare-earth oxides. Preferably, the second particles and the first particles are made of $(La,Sr)MnO_3$ and YSZ, respectively.

(Method of Manufacturing Composite Ceramic Powder)

To manufacture the composite ceramic powder constituted of the composite ceramic particulates each having a composite form in which the agglomerated second particles are separately carried by the agglomerated first particles, a spray pyrolysis is preferably used. The spray pyrolysis includes the steps of preparing a raw material liquid containing raw materials of the first particles and raw materials of the second particles, atomizing the raw material liquid by directing ultrasonic waves or the like to form mist thereof, drying the mist at temperatures below the temperature at which each raw material can be thermally decomposed, that is, at temperatures at which none of the raw materials contained in the raw material liquid can be substantially decomposed, and then thermally decomposing the raw materials. The spray pyrolysis is described in "Ceramic Powder Synthesis by Spray Pyrolysis" by Gray L. Messing et al; Journal of the American Ceramic Society (1993, Vol. 76, No. 11, Pages 2707–2726).

It is important to note that the terminology "thermal decomposition" in the present invention means chemical changes of substances, for example, oxidation of the substances and/or crystallization of amorphous materials. As will be appreciated, development of the crystallization may identified by an X-ray diffraction analysis of treated materials since a crystallized material may form peaks in a diffracted spectrum of an X-ray diffraction.

(Raw Materials for Composite Ceramic Powder)

The raw materials to produce the composite ceramic particulates may be solutions of various kinds of metallic salts or soils of various kinds of metallic oxides which are applicable to the spray pyrolysis.

Types of the raw materials correspond to the types of the first and second particles constituting the composite ceramic particulates.

Further, the raw materials are selected based on uses of the composite ceramic powder containing the composite ceramic particulates.

With the composite ceramic powder for forming the sintered catalytic product described above, the raw materials for the second particles are those which may be thermally decomposed to produce the precursor materials of the catalytic materials, and the raw materials for the first particles are those which may be thermally decomposed to produce the precursor materials of the carrier materials for carrying the catalytic materials. It is to be noted that the "precursor material" of the catalytic materials in the present invention means any materials which may inherently exhibit the catalytic activity or which may exhibit the catalytic activity when processed with sintering, reducing reaction or other treatment. Also, the "precursor materials" of the carrier materials in the present invention means any materials which may inherently act as the catalytic carriers or which may act as the catalytic carriers when processed with sintering, reducing reaction or other treatment.

The raw materials suitable for the second particles are chemical compounds or combinations thereof which may be thermally decomposed to produce the precursor materials of the catalytic materials, that is, one or more members selected from the group consisting of metals such as nickel, cobalt and iron; noble metals such as platinum, palladium and ruthenium; and metallic oxides such as zinc oxide, tin oxide, copper oxide and lanthanum manganate. Moreover, the raw materials suitable for the first particles are chemical compounds or combinations thereof which may be thermally decomposed to produce the precursor materials of the carrier materials, that is, one or more members selected from the group consisting of oxides such as aluminum oxide, silicon oxide, magnesium oxide and titanium oxide.

With the composite ceramic powder for forming the electrodes of the SOFC, the raw materials for the second particles are those which may be thermally decomposed to produce the precursor materials of the conductive materials, and the raw materials for the first particles are those which may be thermally decomposed to produce the precursor materials of the carrier materials for carrying the conductive materials. It is to be noted that the "precursor materials" of the conductive materials in the present invention means any materials which may inherently exhibit conductivity or which may exhibit conductivity when processed with sintering, reducing reaction or other treatment. Also, the "precursor materials" of the carrier materials in the present invention means any materials which may inherently act as the carriers or which may act as the carriers when processed with sintering, reducing reaction or other treatment. For example, when the conductive material for the electrodes of the SOFC and the precursor material thereof are nickel and oxides of nickel, respectively, the raw material may be nickel acetate which may be thermally decomposed to produce oxides of nickel.

With the composite ceramic powder for forming the fuel electrode of the SOFC, the raw materials suitable for the second particles are chemical compounds or combinations thereof which may be thermally decomposed to produce the precursor materials of the conductive materials, that is, one or more members selected from the group consisting of (1) oxides of nickel, (2) solid solution of oxides of nickel and oxides of magnesium, (3) oxides of cobalt and (4) ruthenium.

Specifically, the raw materials may be one or more members selected from the group consisting of acetate, nitrate, carbonate, oxalate and other salts of nickel; acetate, nitrate, carbonate, oxalate and other salts of magnesium; acetate, nitrate, carbonate, oxalate and other salts of cobalt; acetate, nitrate, carbonate, oxalate and other salts of ruthenium; and hydroxides of nickel, magnesium, cobalt and ruthenium.

On the other hand, the raw materials suitable for the first particles are chemical compounds or combinations thereof which may be thermally decomposed to produce the precursor materials of the carrier materials, that is, one or more members selected from the group consisting of (1) stabilized zirconia (FSZ) represented by yttria stabilized zirconia (YSZ), (2) partially stabilized zirconia (PSZ) and (3) ceric oxide doped with rare-earth oxides.

Specifically, the raw materials may be one or more members selected from the group consisting of soils of FSZ; soils of PSZ; sols of ceric oxide doped with rare-earth oxides; acetate, nitrate, carbonate, oxalate and other salts of the elements constituting the FSZ, PSZ or ceric oxide doped with rare-earth oxides; and hydroxides of the elements constituting the FSZ, PSZ or ceric oxide doped with rare-earth oxides.

With the composite ceramic powder for forming the air electrode of the SOFC, the raw materials suitable for the second particles are chemical compounds or combinations thereof which may be thermally decomposed to produce the precursor materials of the conductive materials, that is, one or more members selected from the group consisting of $(La,Sr)MnO_3$, $(La,Ca)MnO_3$, $(La,Sr)CoO_3$ and $(La,Ca)CoO_3$.

For example, such raw materials may be one or more members selected from the group carbonate,g of acetate, nitrate, carbonate, oxalate and other salts of lanthanum; acetate, nitrate, carbonate, oxalate and other salts of strontium; acetate, nitrate, carbonate, oxalate and other salts of manganese; acetate, nitrate, carbonate, oxalate and other salts of calcium; acetate, nitrate, carbonate, oxalate and other salts of cobalt; and hydroxides of lanthanum, strontium, manganese, calcium and cobalt.

On the other hand, the raw materials suitable for the first particles are chemical compounds or combinations thereof which may be thermally decomposed to produce the precursor materials of the carrier materials, that is, one or more members selected from the group consisting of FSZ, PSZ and ceric oxide doped with rare-earth oxides.

For example, the raw materials may be one or more members selected from the group consisting of sols of FSZ; sols of PSZ; sols of ceric oxide doped with rare-earth oxides; acetate, nitrate, carbonate, oxalate and other salts of the elements constituting the FSZ, PSZ or ceric oxide doped with rare-earth oxides; and hydroxides of the elements constituting the FSZ, PSZ or ceric oxide doped with rare-earth oxides.

Some of the raw materials are mixed with a solvent to formulate the raw material liquid. The raw material liquid may be a solution formed by dissolving the raw materials in the solvent, a sol formed by dispersing the raw material in the solvent, or a mixture thereof. As will be appreciated, the raw materials may be in a dissolved state or a solid state in the raw material liquid.

As described hereinafter, when the raw material liquid is dried, it is possible to produce mist of the raw material liquid in which the first particles are localized around the surface of the second particles or in which the first and second particles are uniformly dispersed, depending on the difference between the raw materials of the first particles and the raw materials of the second particles in solubility or physical states in the raw material liquid.

(Atomization, Drying and Thermal Decomposition of the Raw Material Liquid)

Subsequently, the raw material liquid is atomized. When the raw material liquid is atomized by directing the ultrasonic waves to form the mist thereof, frequencies of a transducer for generating the ultrasonic waves may be preferably controlled to change the size of the composite ceramic particulates to be ultimately produced.

The formed mist is then dried at temperatures below the temperature at which each raw material can be thermally decomposed, that is, at temperatures at which none of the raw materials contained in the raw material liquid can be substantially decomposed. Thereafter, the raw materials are thermally decomposed.

In the raw material liquid as formulated, if each of the raw materials of the first particles has solubility in the solvent greater than that of each of the raw materials of the second particles, the raw materials of the second particles each having lower solubility may precipitate and agglomerate before the raw materials of the first particles precipitate and agglomerate when the mist is dried. As a result, the first particles are localized around the surface of the second particles.

Further, in the raw material liquid, if each of the raw materials of the first particles is in the solid state whereas each of the raw materials of the second particles is in the dissolved state, the raw materials of the first particles in the solid state tend to concentrate to the surface of the mist when the mist is dried. As a result, the raw materials of the second particulates in the dissolved state precipitate and agglomerate in the central portion of the mist so that the first particles are localized around the surface of the second particles.

Additionally, the tendency of the formation of the composite form in which the first particles are localized around the second particles increases as the total concentration of the raw materials in the raw material liquid becomes greater.

Moreover, a suitable range of the concentration (mol %) of each of the raw materials and a suitable range of the total concentration of the raw materials may be determined depending on the combination of the raw materials, the physical states of the raw materials in the raw material liquid, that is, whether each of the raw materials is in the dissolved state or the solid state in the raw material liquid, or other conditions.

The following is an example for forming the fuel electrode of the SOFC in which the sol of YSZ (average particle size of YSZ particles: 60 nm) and nickel acetate tetrahydrate (aqueous solution) are used as the raw material of the first particles and the raw material of the second particles, respectively. These raw materials are mixed to formulate the raw material liquid. The raw material liquid thus formulated is then thermally decomposed by the spray pyrolysis, thereby to produce the composite particulates. In each composite particulate, the particles of NiO are centrally agglomerated and the particles of YSZ are positioned around the agglomerated NiO particles. The composite particulates are sintered to form the fuel electrode of the SOFC. In the raw material liquid, the proportion of nickel to YSZ is preferably 90:10 to 50:50 in mol %. This is because the YSZ contents greater than 50 mol % may reduce the conductivity of the fuel electrode of the SOFC and because the YSZ contents lesser than 10 mol % may not sufficiently carry or support nickel in the fuel electrode. More preferably, the proportion of nickel to YSZ in mol % is 80:20 to 70:30.

Furthermore, the concentration of nickel acetate in the raw material liquid is preferably greater than 0.01 mol/l, more preferably, 0.2–0.3 mol/l, as a thermal decomposition product thereof or nickel oxide (NiO).

When the mist is dried and thermally decomposed, the mist is continuously moved by a carrier gas. Increased flow rates of the carrier gas may contribute to the formation of the hollow spherical particulates or the enlargement of a hollow space of each particulate. On the contrary, reduced flow rates of the carrier gas may contribute to the formation of the solid spherical particulates or the reduction of the hollow space of each particulate. In other words, inner forms of the spherical particulates to be produced can be effectively controlled by changing the flow rates of the carrier gas.

Also, when the mist is dried and thermally decomposed, higher temperature gradients may contribute to the formation of the hollow particulates or the enlargement of a hollow space of each particulate. On the contrary, lower temperature gradients may contribute to the formation of the solid spherical particulates or the reduction of the hollow space of each particulate. In other words, the inner forms of the spherical particulates to be produced can be controlled by changing the temperature gradients between the drying process and the thermally decomposing process.

Thus, the composite particulates can be produced by atomizing, drying and thermally decomposing the raw material liquid. A machine suitable for producing the composite ceramic particulates includes an atomizing means for atomizing the raw material to form mist, a moving passage for moving the mist, a plurality of heat generating means positioned in the passage and directed in the direction in which the mist is moved. With the machine, the mist is dried and thermally decomposed while moving in the moving passage.

Figure 2:
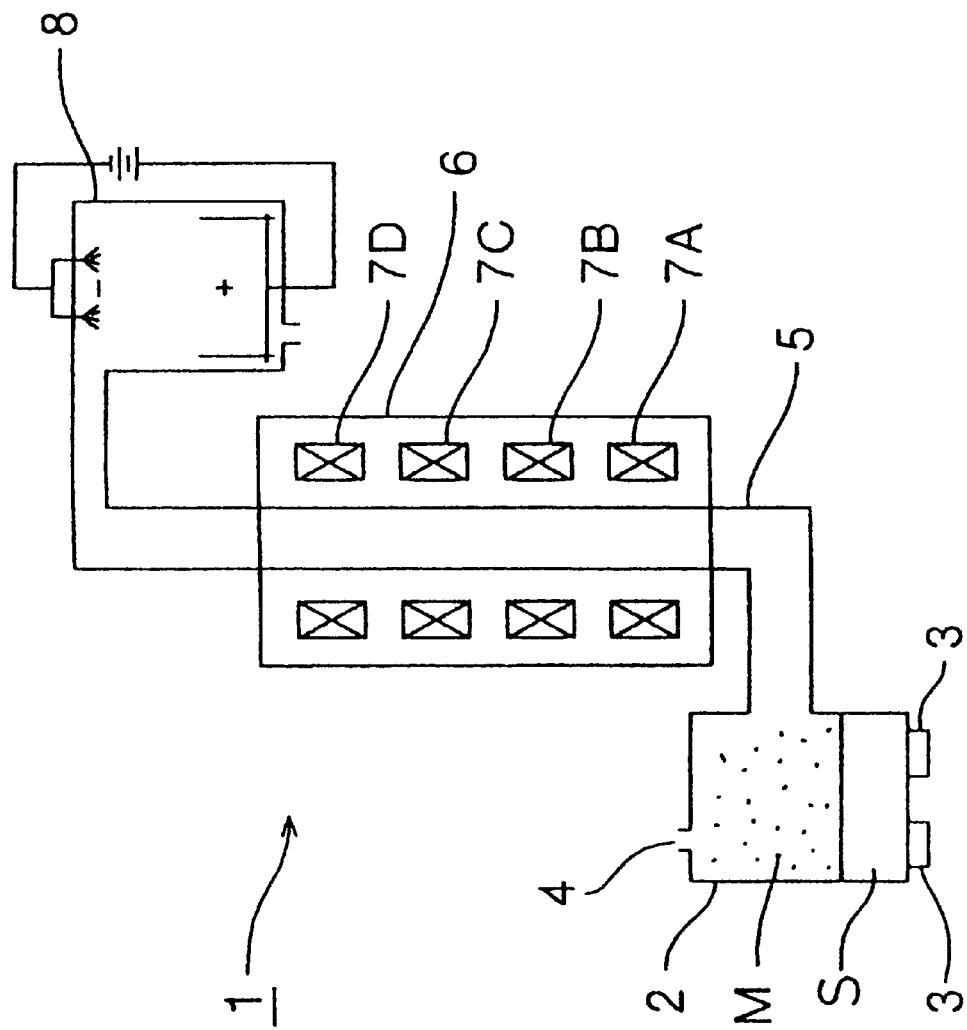
FIG. 2 is a schematic view of a spray pyrolysis machine used in the present invention.

Such a machine is exemplary shown in FIG. 2. The machine 1 has an atomizing chamber 2 in which a transducer 3 as the atomizing means is provided, a silica glass tube 5 as the moving passage communicating with the atomizing chamber 2, electric heat generators 7A, 7B, 7C and 7D arranged on the outside surface of the silica glass tube 5 to heat the interior of the silica glass tube 5, and an electric dust collector 8 coupled to the silica glass tube 5. A carrier gas is introduced into the atomizing chamber 2 so that the mist M flows through the silica glass tube 5.

Each of the electric heat generators 7A, 7B, 7C and 7D is controlled such that the mist M is dried and thermally decomposed while moving in the silica glass tube 5.

The raw materials contained in the mist M are oxidized and/or crystallized to produce the composite particulates CP after they are dried and thermally decomposed. The composite particulates CP thus produced are, for example, collected by the electric dust collector. The collected composite particulates are then calcined and crystallized. Thereafter, the calcined composite particulates are milled and unbound to form the composite ceramic powder.

In the composite ceramic powder, as shown in FIG. 1, each composite particulates CP is constituted of the agglomerated second particles P2 and the agglomerated first particles P1 which is localized on the surface of the agglomerated second particles P2. Therefore, the surface of the agglomerated second particles P2 is covered with the first particles P1. It is to be noted, however, that the surface of the agglomerated second particles P2 may be partially covered with the first particles P1.

According to the method, the composite particulates each having the spherical shape can be easily obtained. Such composite particulates may be further ground to form the indeterminate shape of composite ceramic particulates.

For example, if the raw materials are selected for forming the sintered catalytic product described above, the composite ceramic powder suitable for forming the sintered catalytic product can be produced. The composite ceramic powder contains the composite particulates each of which is constituted of the first particles made of the precursor materials of the carrier materials and the second particles made of the precursor materials of the catalytic materials which may exhibit the catalytic activity when preferably treated.

Further, if the raw materials are selected for forming the electrodes of the SOFC described above, the composite ceramic powder suitable for forming the electrodes of the SOFC can be produced. The composite ceramic powder contains the composite particulates each of which is constituted of the first particles made of the precursor materials of the carrier materials which may support the conductive materials and the second particles made of the precursor materials of the conductive materials.

When the composite ceramic powder containing the composite particulates each having such a composite form is sintered, particle growth of the first and second particles may occur during the course of the sintering process. As a result, each composite particulate is deformed. Further progress of the particle growth of the first and second particles may form the dispersion structure in which an indeterminate shape of mass of the agglomerated second particles is surrounded and separately supported by an indeterminate shape of mass of the agglomerated first particles.

Such a dispersion structure may provide a new supporting structure of the catalytic particles and a novel structure of the electrodes of the SOFC.

Particularly, when the composite ceramic powder suitable for forming the sintered catalytic product as described above is sintered, the particle growth of the first and second particles in each composite particulate may occur. As a result, the first and second particles may form the indeterminate shape of mass of the agglomerated carrier particles and the indeterminate shape of mass of the agglomerated catalytic particles, respectively, thereby forming the dispersion structure in which the agglomerated catalytic particles are surrounded and separately supported by the agglomerated carrier particles. The catalytic particles thus carried may constantly exhibit the catalytic activity.

The sintered catalytic product formed by sintering the composite ceramic powder is treated to provide the catalytic activity to the catalytic particles, if necessary. Specifically, the sintered catalytic product is processed with sintering, sintering accompanied by reduction treatment or other treatments which are conducted as separate processes.

Further, when the composite ceramic powder suitable for forming the electrodes of the SOFC as described above is sintered, the electrodes of the SOFC are formed. In the electrodes, the indeterminate shape of mass of the agglomerated conductive particles is surrounded and separately carried by the agglomerated carrier particles. According to the structure of the electrodes of the SOFC, the agglomerated conductive particles are effectively prevented from aggregating with each other when the electrodes are used at higher temperatures. This may prevent the electrodes from deteriorating the electrical properties thereof. As will be appreciated, the electrodes are then processed with the reduction treatment or other treatments to provide the conductivity to the conductive particles, if necessary.

When the composite ceramic powder including the composite particulates each of which is constituted of the first particles made of YSZ and the second particles made of NiO is sintered to form a sintered product, the agglomerated NiO particles are surrounded and separately carried by the agglomerated YSZ particles. If the sintered product is treated to reduce NiO to Ni and is used as one of the electrodes of the SOFC, the Ni particles are effectively prevented from bonding and/or aggregating with each other. Therefore, the sintered product thus treated may stably exhibit the desired electrical properties for a long period of time. This is preferable for the fuel electrode of the SOFC.

(Example)

An example of the present invention will be described in detail. It is to be noted, however, that the following example should not be construed as limiting the invention.

In this example, the composite ceramic powder suitable for forming the fuel electrode of the SOFC was manufactured. The composite ceramic powder contains the composite particulates each of which is constituted of the particles of NiO and the particles of YSZ. As will be appreciated, the NiO particles are particles of the precursor materials of the conductive materials (Ni) and correspond to the second particles of the composite particulates. On the other hand, the YSZ particles are particles of the precursor materials of the carrier materials and correspond to the first particles of the composite particulates.

$Ni(CH_3COO)_2 \cdot 4H_2O$ (reagent grade) as the raw materials for the NiO particles and the sol of YSZ (reagent grade) as the raw materials for the YSZ particles were dissolved to formulate the raw material liquid. The proportion of $Ni(CH_3COO)_2 \cdot 4H_2O$ to the sol of YSZ were determined such that the proportion of the thermal decomposition product (oxide) or NiO to YSZ was 75:25 in mol %. Also, the concentration of $Ni(CH_3COO)_2 \cdot 4H_2O$ in the raw material liquid was 0.25 mol/l as NiO.

$Ni(CH_3COO)_2$ was dissolved in the raw material liquid to produce Ni ions therein. On the other hand, YSZ was in the solid state therein. Further, the solvent as used was water.

The raw material liquid was treated by using the machine (which was manufactured by Iwatani Sangyo Kabushiki Kaisha) shown in FIG. 2, thereby manufacturing the composite ceramic powder.

First, the raw material liquid was introduced into the atomizing chamber 2 of the machine 1, with the transducer 3 energized to generate the ultrasonic wave of 1.7 MHz, thereby producing the mist M of the raw material liquid. The produced mist M was transferred by the carrier gas or air (flow rate: 3 l/min), and was introduced into the silica glass tube 5 previously heated by the electric heat generators 7A, 7B, 7C and 7D. The electric heat generators 7A, 7B, 7C and 7D were controlled in such a way that the interior of the silica glass tube 5 was heated to 200° C., 400° C., 800° C. and 1000° C.

Thus, the mist M was slowly heated in the silica glass tube 5. As a result, the mist M was dried at temperatures at which the raw materials can not be thermally decomposed, and was then thermally decomposed to intermediate powder.

The intermediate powder discharged from the silica glass tube 5 provided with the electric heat generators 7A, 7B, 7C and 7D was collected by the electric dust collector 8. The collected intermediate powder was calcined and recrystallized at 1000° C. for four hours. Thereafter, the calcined powder was gently pulverized and unbound to the ultimate composite ceramic powder.

Figure 3:
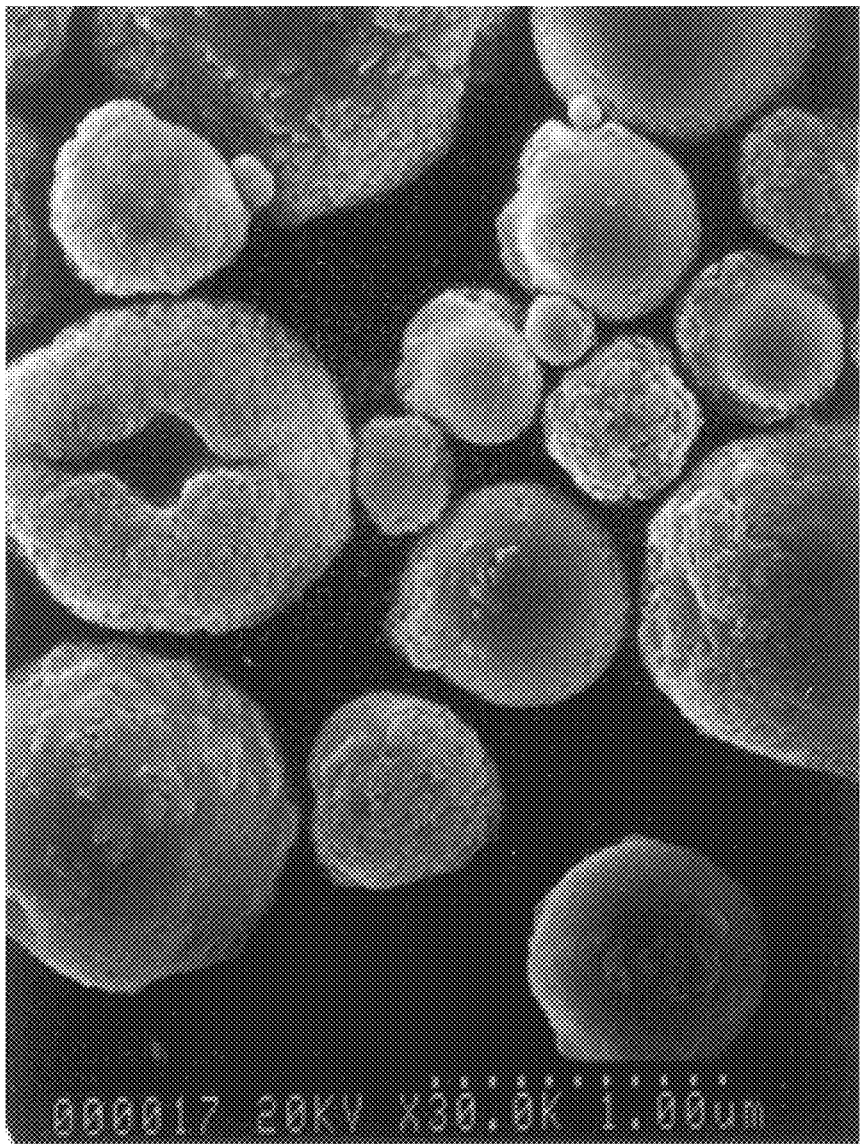
FIG. 3 is a photograph (magnification of ×30000) of the composite ceramic powder taken by an electron microscope.

The composite ceramic powder was observed by a scanning electron microscope (SEM). As shown in FIG. 3, the composite ceramic powder contains the spherical composite particulates. In each composite particulate, the surface of the agglomerated NiO particles is covered by the agglomerated YSZ particles. In particular, as shown in the drawing, the agglomerated NiO particles having a relatively smooth surface is covered by the agglomerated YSZ particles having a rough surface. Further, NiO and YSZ are qualitatively identified by utilizing an energy dispersive spectroscopy (EDS).

The composite particulates have limited size variations and the average size thereof is about 1 $\mu$m. Each composite particulate is of the solid type.

The composite ceramic powder was screen-stenciled on the surface of a 10YSZ plate ($ZrO_2$ stabilized by 10 mol % $Y_2O_3$) having a thickness of 0.5 mm. The plate was then heated at 1350° C. for two hours to bake the powder on the surface thereof, thereby forming the fuel electrode having an effective area of 10 $cm^2$. To screen-stencil the composite ceramic powder on the plate, the composite ceramic powder was mixed with polyethylene glycol of 0.4 gram as a binding agent and ethanol of 6 gram as a dispersing agent and was agitated in an automatic alumina mortar for fifteen minutes to volatilize ethanol. Thereafter, the mixture was screen-stenciled (mesh #200) on the YSZ plate. The product was used in the SOFC to reduce NiO to Ni, thereby forming the fuel electrode or Ni/YSZ fuel electrode having a thickness of 30 $\mu$m.

Figure 4:
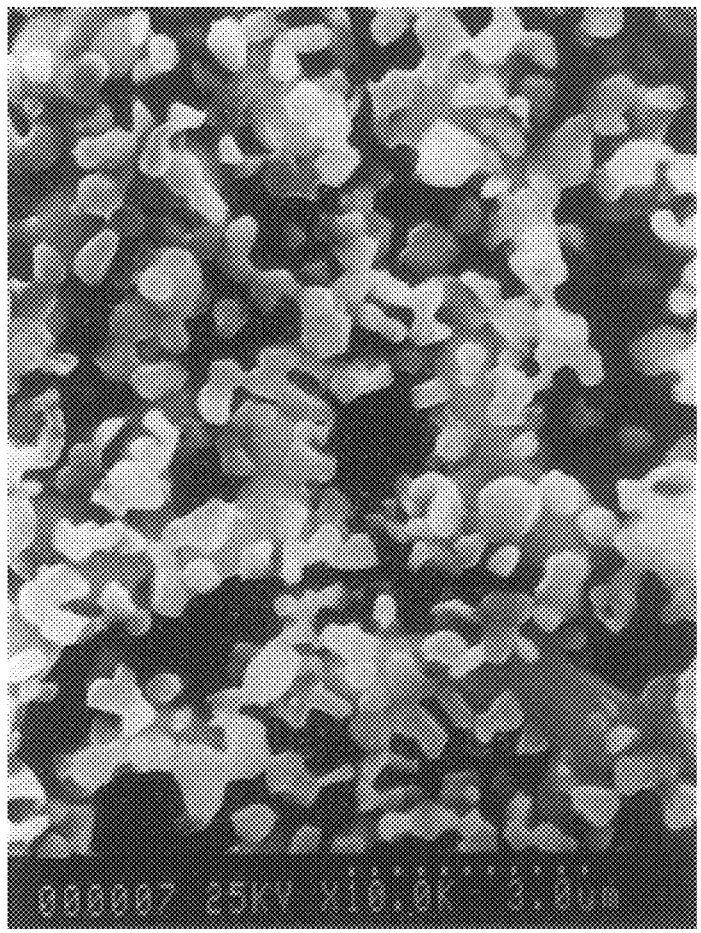
FIG. 4 is a photograph (magnification of ×10000) of a fuel electrode of an SOFC (Ni—YSZ fuel electrode) made of the composite ceramic powder taken by the electron microscope.
Figure 5:
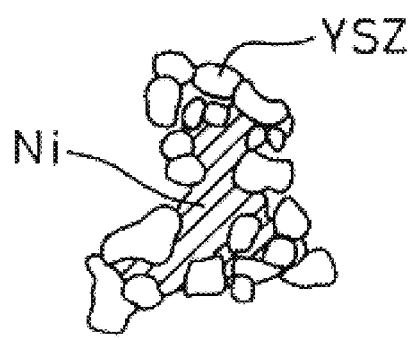
FIG. 5 is a fragmentary pictorial view of an encircled portion in FIG. 4.

A structure of the fuel electrode thus formed observed by SEM is shown in FIG. 4. Further, a pictorial view of an encircled portion in FIG. 4 is shown in FIG. 5. When the composite ceramic powder is baked to sinter the NiO particles and the YSZ particles, each composite particulate is deformed, thereby producing the indeterminate shape of mass of the agglomerated NiO particles and the indeterminate shape of mass of the agglomerated YSZ particles. In particular, the indeterminate shape of mass of the agglomerated YSZ particles is significantly formed by the particle growth of the YSZ particles positioned on the surface of each composite particulate.

In the fuel electrode used in the SOFC or processed with the reduction treatment, the particle growth of Ni and YSZ occurs, thereby forming the dispersion structure in which Ni is surrounded by YSZ, that is, as shown in FIGS. 4 and 5, the large and dark colored mass of the agglomerated Ni particles is surrounded by the small and light colored mass of the agglomerated YSZ particles.

Moreover, in this example the composite ceramic powder suitable for forming the air electrode of the SOFC was manufactured. The composite ceramic powder contains the composite particulates each of which is constituted of the particles of $La(Sr)MnO_3$ and the particles of YSZ. Like the fuel electrode, the composite ceramic powder was mixed with polyethylene glycol and ethanol and was agitated to volatilize ethanol. Thereafter, the mixture was screen-stenciled on the YSZ plate. The product was then heated at 1200° C. for four hours to bake the powder on the surface thereof, thereby forming the air electrode. Additionally, a Pt wire was bonded to the side surface of an additional YSZ plate to form a control electrode. These YSZ plates were tested by continuously passing electricity (current density: 300 mA/$cm^2$) therethrough at 1000° C. for one thousand hours. Polarization potentials of the fuel electrode with time were determined to evaluate long-term stability of the electrode. The polarization potentials of the fuel electrode were determined by a current interrupter method. The determination results are shown in FIG. 6.

As will be recognized, the current interrupter method is a method in which current traveling through the cell is momentarily interrupted to induce the change in voltage, thereby determining the polarization potentials following the change in voltage. With this method, the polarization potentials of the electrode can be obtained as electrochemical polarization potentials (η polarization potentials) which correspond to performance of the electrode and ohmic losses (IR polarization potentials) which reflect resistance of electrolytes. It is to be understood that the electrode exhibiting smaller η polarization potentials may serve as a more efficient electrode.

Figure 6:
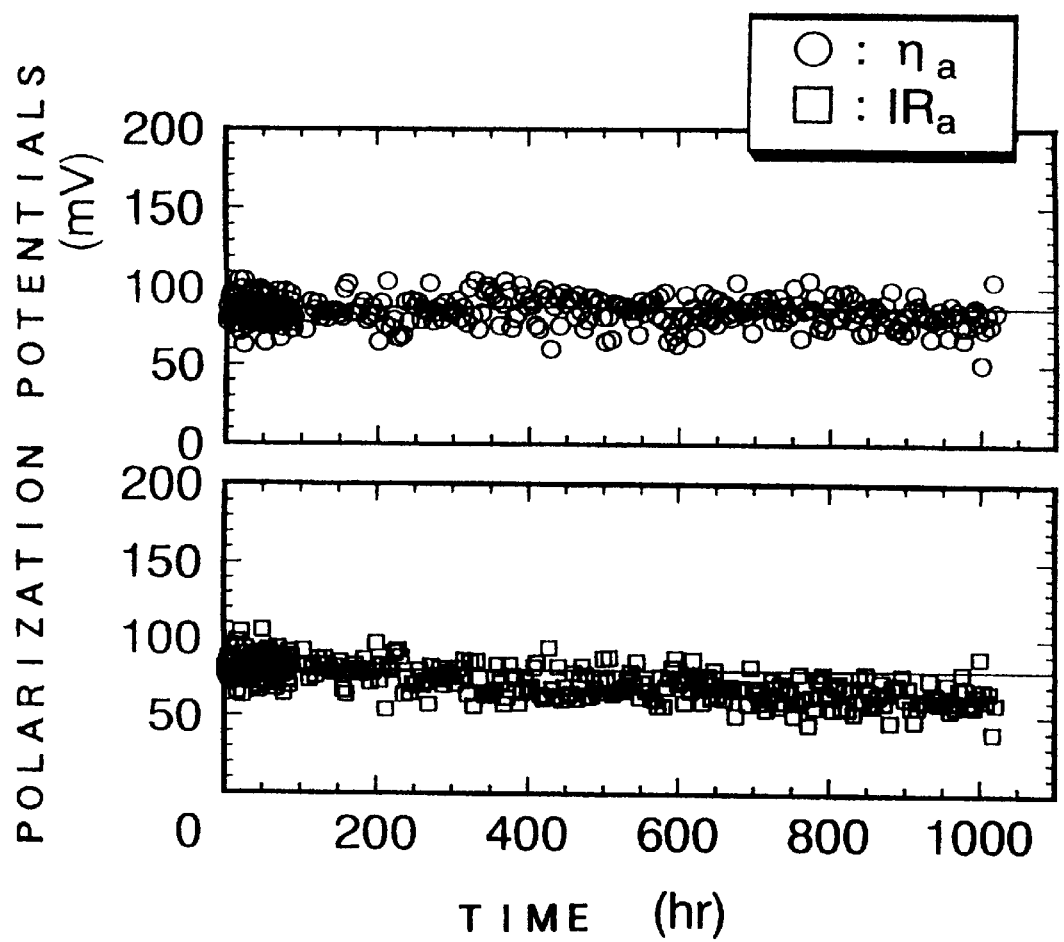
FIG. 6 are graphs showing polarization potentials of the fuel electrode of the SOFC vs. time.

As shown in FIG. 6, the electrochemical polarization potentials (η polarization potentials) are constant, that is, no apparent degradation of the electrode is observed over one thousand hours. This means that the electrode is stable over this period of time in microstructures of the three-phase interfaces (Ni—YSZ-fuel gas($H_2$+3%$H_2O$) interfaces) which act as electrode reaction sites. In other words, the fuel electrode in this example has the microstructures in which the agglomerated Ni particles are enclosed by the agglomerated YSZ particles, so that the aggregation of the agglomerated Ni particles is effectively prevented.

Further, the polarization potentials of the electrode in this example are smaller than those of the fuel electrode formed of the composite ceramic powder which is manufactured by conventional methods such as a powdered materials mixing method and a dropping thermal decomposition method. This shows that the fuel electrode of the present invention is an efficient electrode.

The IR polarization potentials are reduced with time. This is because contact resistance between a nickel felt used as a collector and the Ni/YSZ fuel electrode is improved.

Although the electrodes were additionally tested by continuously passing electricity (current density: 300 mA/cm$^2$) therethrough for three thousands hours, the electrochemical polarization potentials are not lowered.

Industrial Applicability

The composite ceramic powder according to the present invention can be used as materials for forming ceramic products such as the sintered catalytic product, the electrodes of the SOFC and other sintered ceramic products.

The method of manufacturing the composite ceramic powder according to the present invention may provide the composite ceramic materials (sic) suitable for forming such ceramic products.

What is claimed is:

1. Composite ceramic powder comprising composite ceramic particulates as constituent particulates, each of said composite ceramic particulates being constituted of a group of first particles and a group of second particles in which said first particles are localized around said second particles.

2. The composite ceramic powder as defined in claim 1, wherein said second particles comprise particles made of materials which may exhibit catalytic activity, and wherein said first particles comprises particles made of materials which may act as a catalytic carrier.

3. The composite ceramic powder as defined in claim 1, wherein said second particles comprise particles made of precursor materials of conductive materials for electrodes of a solid oxide fuel cell, and wherein said first particles comprises particles made of precursor materials of carrier materials which may act as a carrier for the conductive materials in the electrodes.

4. The composite ceramic powder as defined in claim 1, wherein said second particles comprise particles made of nickel oxide (NiO), and wherein said first particles comprises particles made of yttria stabilized zirconia.

5. The composite ceramic powder as defined in claim 1, wherein said composite ceramic particulates have substantially spherical shapes.

6. A method of manufacturing an electrode of a solid oxide fuel cell, comprising the steps of:

sintering composite ceramic powder containing composite ceramic particulates, each of the composite ceramic particulates being constituted of particles made of precursor materials of conductive materials for the electrode and particles made of precursor materials of carrier materials which may act as a carrier for the conductive materials in the electrode, in which the latter particles are localized around the former particles.

7. An electrode comprising nickel particles surrounded and separately supported by yttria stabilized zirconia particles, in a nickel:yttria stabilized zirconia molar ratio between 90:10 and 50:50.

8. A solid oxide fuel cell comprising a fuel electrode as defined in claim 7 and an air electrode.

9. A method of manufacturing a composite ceramic powder comprising the steps of:

atomizing a liquid comprising a first particle raw material and a second particle raw material to form a mist, the first particle raw material and the second particle raw material each having a known thermal decomposition temperature;

drying the mist at a temperature below the thermal decomposition temperature of both of the raw materials, to form particulates in which the first particle raw material is disposed around the second particle raw material; and thermally decomposing the first particle raw material and the second particle raw material in the particulates.

10. A method as in claim 9, wherein the first particle raw material comprises nickel and the second particle raw material comprises yttria stabilized zirconia, and wherein the liquid comprises the nickel and yttria stabilized zirconia in a nickel:yttria stabilized zirconia molar ratio between 90:10 and 50:50.

11. A method as in claim 9, wherein the first particle raw material is in a solid state suspended in the liquid and the second particle raw material is dissolved in the liquid.

12. A method as in claim 9, wherein the first particle raw material and the second particle raw material are both dissolved in the liquid and the first particle raw material has a solubility in the liquid that is greater than the second particle raw material.

13. Composite ceramic powder comprising composite ceramic particulates, each of said composite ceramic particulates comprising a group of first particles and a group of second particles in which said second particles form a core having a surface and said first particles are disposed at least partially covering the surface of said core.

14. The composite ceramic powder of claim 13, wherein said second particles comprise a material having catalytic activity, and wherein said first particles comprise a material which acts as a catalytic carrier.

15. The composite ceramic powder as defined in claim 13, wherein said second particles comprise a precursor of a conductive material for electrodes of a solid oxide fuel cell, and wherein said first particles comprise a precursor of a carrier material for the conductive material in the electrodes.

16. The composite ceramic powder as defined in claim 13, wherein said second particles comprise nickel oxide (NiO), and wherein said first particles comprise yttria stabilized zirconia.

17. A method of manufacturing an electrode of a solid oxide fuel cell, comprising the steps of:

sintering composite ceramic powder containing composite ceramic particulates, each of the composite ceramic particulates comprising particles made of a precursor of a conductive material for the electrode and particles made of a precursor of a carrier material for the conductive material in the electrode, in which the carrier material precursor particles are disposed around the conductive material precursor particles.

* * * * *